Figure 1:
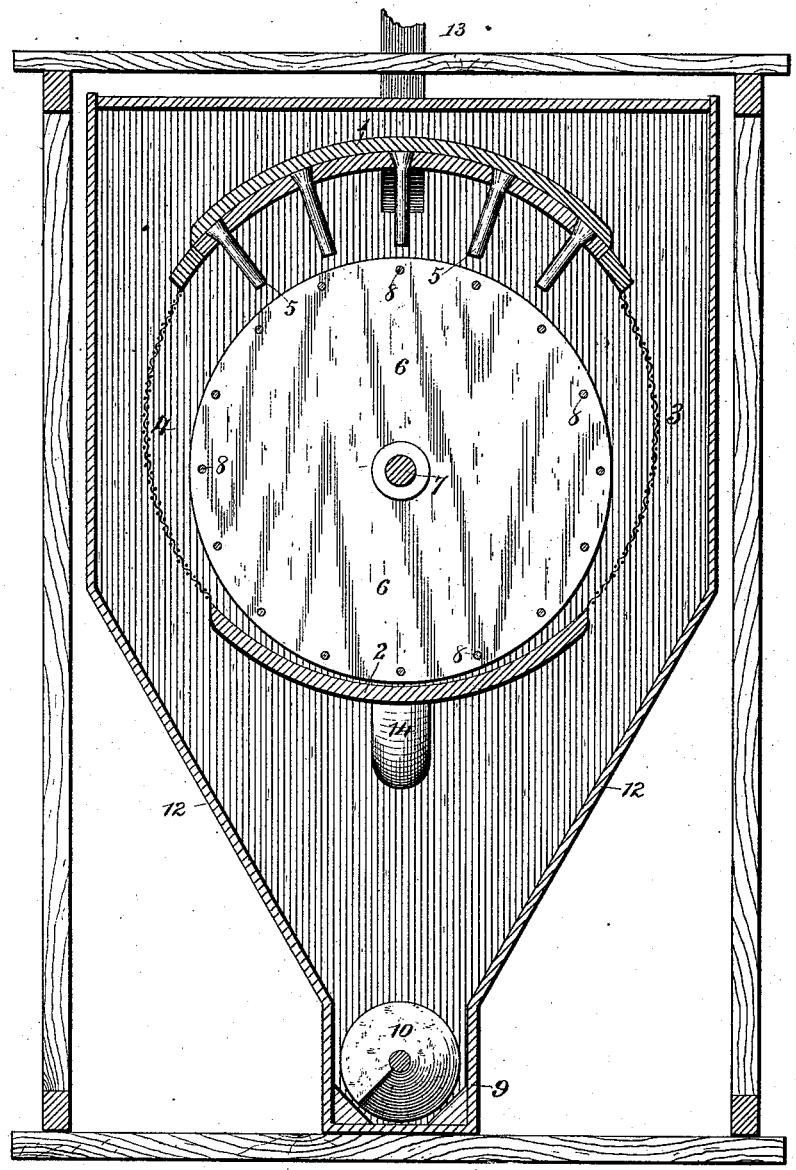

United States Patent Office.

JOHN M. CASE, OF COLUMBUS, OHIO, ASSIGNOR TO THE CASE MANUFACTURING COMPANY, OF SAME PLACE.

PROCESS OF REDUCING GRAIN TO MIDDLINGS AND FLOUR.

SPECIFICATION forming part of Letters Patent No. 297,762, dated April 29, 1884.

Application filed December 4, 1883. (No model.)

*To all whom it may concern:*

Be it known that I, JOHN M. CASE, a citizen of the United States, residing at Columbus, in the State of Ohio, have invented a new and Improved Process of Reducing Grain to Middlings and Flour, of which the following is a specification.

My invention has for its object the separation of all the interior starch and glutinous parts of wheat from the bran and germ without materially abrading the bran.

In order that my invention may be fully understood, and the parts which I claim now as new specifically set forth, it becomes necessary for me to refer to the state of the art and the objects which inventors have sought to attain.

The old manner of reducing wheat to flour was to grind the same between millstones having sharp cutting-surfaces. This manner of reducing wheat necessarily reduced to fine powder much of the bran-coating, and also the germ, which products, when once mixed with the flour-producing part of the berry, could not be fully separated, and as a result low-ground stone-made flour always has a dark color. To obviate this, rolls have been invented provided with corrugations of varying fineness, through which the wheat is successively passed in a series of brakes and scalping operations. The scalping-reels, used to separate the middlings after each reduction, are simply rotating reels or shaking riddles, and do not act in any manner to produce a further reduction of the wheat, but only to make a separation of such middlings and flour as have been made in passing through the rolls. It is also true that the sharp corrugated rolls cause an abrasure or scraping of the bran, as in grinding with stones, but not to so great an extent. In my system I dispense with the use of sharp corrugated rolls or any machine having a cutting action, and am thus enabled to make a complete separation of the bran and germ from the flour-producing parts without permitting any of the bran or germ to become incorporated with the flour, thus making a very high grade of flour and a very small percentage of low grade.

In my invention I first split the wheat through the seam by passing the same through a suitable machine made for that purpose. The second step is to remove the germ and crease impurities. The wheat thus prepared is sent to a pair of crushing-rolls, preferably smooth, and having a differential speed. Instead of paired rolls, a roll and plate or a pair of disks or plates, or other means may be used to effect the crushing of the grain without cutting; but the preferred device for this purpose consists of a pair of smooth rolls moving at different speeds. This product is now sent to a disintegrating or whipping machine constructed in a manner to produce great activity of the stock operated upon. This action may be produced by currents of air forcing the crushed grain against targets or any suitable machine; but I prefer to employ the device constructed as follows: a rapidly-rotating shaft provided with two heads, connected together by wire beaters mounted eccentrically within a stationary cylinder, consisting of a wire screen, and also fixed percussion-points against which the material is thrown with great force, whereby all the material loosened from the bran by crushing is dislodged and separated therefrom by means of the wire screen. This machine is fully described in my application No. 113,560, filed December 4, 1883. The materials, passing over the tail of this reel, are sent back to another crushing-roll, and then to another disintegrating-machine, as above explained. This series of crushing and whipping actions may be extended to two, three, four, or more operations; but if the disintegrating-machine is run at too high speed, and the machines are not loaded beyond their capacity, the flour-producing material may be completely separated from the bran at three operations.

It will be seen that I do not depend upon the rolls to make middlings, as is done in the present roller system, but use the rolls simply to crush the stock, so that the disintegrating-machine will operate more readily and effectually upon the same.

After the flour-producing parts have been completely separated from the bran and germ, I send the product thus obtained to ordinary (No Model.)  2 Sheets—Sheet 1.

J. M. CASE.
DISINTEGRATING AND SEPARATING MACHINE.

No. 297,763.  Patented Apr. 29, 1884.

ATTEST
Geo. T. Smallwood.
Geo. S. Wheelock.

INVENTOR
John M. Case,
by Knight Bros
attys